United States Patent
Potnis et al.

(10) Patent No.: US 6,837,056 B2
(45) Date of Patent: Jan. 4, 2005

(54) TURBINE INLET AIR-COOLING SYSTEM AND METHOD

(75) Inventors: Shailesh Vijay Potnis, Greer, SC (US); Narendra Digamber Joshi, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 46 days.

(21) Appl. No.: 10/322,752

(22) Filed: Dec. 19, 2002

(65) Prior Publication Data

US 2004/0118125 A1 Jun. 24, 2004

(51) Int. Cl.[7] .............................................. F02C 3/30
(52) U.S. Cl. .......................... 60/775; 60/775; 60/39.5; 60/39.511
(58) Field of Search ..................... 60/775, 39.3, 39.5, 60/39.511, 39.52, 39.53, 730, 728; 62/271; 95/149

(56) References Cited

U.S. PATENT DOCUMENTS

| | | | |
|---|---|---|---|
| 4,205,529 A | * | 6/1980 | Ko ............................. 62/235.1 |
| 4,222,244 A | * | 9/1980 | Meckler ..................... 62/235.1 |
| 4,955,205 A | * | 9/1990 | Wilkinson ...................... 62/94 |
| 5,020,334 A | * | 6/1991 | Wilkinson ................... 62/271 |
| 5,022,241 A | * | 6/1991 | Wilkinson ................... 62/271 |
| 5,070,703 A | * | 12/1991 | Wilkinson ..................... 62/94 |
| 5,165,241 A | | 11/1992 | Joshi et al. |
| 5,182,921 A | * | 2/1993 | Yan ........................... 62/235.1 |
| 5,203,161 A | * | 4/1993 | Lehto ........................ 60/39.53 |
| 5,251,447 A | | 10/1993 | Joshi et al. |
| 5,323,604 A | | 6/1994 | Ekstedt et al. |
| 5,351,477 A | | 10/1994 | Joshi et al. |
| 5,511,375 A | | 4/1996 | Joshi et al. |
| 5,590,529 A | | 1/1997 | Joshi et al. |
| 5,596,873 A | | 1/1997 | Joshi et al. |
| 5,613,363 A | | 3/1997 | Joshi et al. |
| 5,638,682 A | | 6/1997 | Joshi et al. |
| 5,675,971 A | | 10/1997 | Angel et al. |
| 5,680,766 A | | 10/1997 | Joshi et al. |
| 5,778,676 A | | 7/1998 | Joshi et al. |
| 5,816,049 A | | 10/1998 | Joshi |
| 5,865,024 A | | 2/1999 | Kress et al. |
| 5,890,372 A | * | 4/1999 | Belding et al. ............... 62/271 |
| 6,050,082 A | | 4/2000 | Leonard et al. |
| 6,050,100 A | * | 4/2000 | Belding et al. ............... 62/271 |
| 6,141,967 A | | 11/2000 | Angel et al. |
| 6,178,762 B1 | * | 1/2001 | Flax ............................. 62/271 |
| 6,195,607 B1 | | 2/2001 | Rajamani et al. |
| 6,216,483 B1 | * | 4/2001 | Potnis et al. ................. 62/271 |
| 6,449,953 B1 | | 9/2002 | Hook, Jr. et al. |
| 6,460,340 B1 | | 10/2002 | Chauvette et al. |
| 6,513,339 B1 | * | 2/2003 | Kopko ............................ 62/94 |

* cited by examiner

*Primary Examiner*—Cheryl J. Tyler
*Assistant Examiner*—William H. Rodriguez
(74) *Attorney, Agent, or Firm*—Nixon & Vanderhye P.C.

(57) ABSTRACT

A turbine inlet air-cooling system improves turbine performance and efficiency. A dehumidifier receives process airflow and reduces a moisture content of the process airflow. An indirect evaporative cooler receives the process airflow from the dehumidifier and is driven by the process airflow from the dehumidifier such that a first portion of the process airflow is contacted directly with water and a second portion of the process airflow is cooled without any addition of moisture. A direct evaporative cooler receives the second portion of the process airflow, which is contacted directly with water to provide evaporative cooling. Subsequently, the direct evaporative cooler outputs the second portion of the process airflow to the turbine.

16 Claims, 2 Drawing Sheets

TURBINE INLET AIR-COOLING SYSTEM AND METHOD

BACKGROUND OF THE INVENTION

The present invention relates to a turbine inlet air-cooling system and, more particularly, to a turbine inlet air-cooling system using direct and indirect evaporative cooling to improve turbine performance and efficiency. The word "turbine" as used in this application should be interpreted to encompass a gas turbine or any other "air-breathing" engines, such as internal combustion engines (i.e., diesel engines) and fuel cells.

A limitation shared by all combustion turbines is that they are mass flow limited. The output power is limited by the mass of air passing through the bellmouth into the first stage of compression. The mass flow rate of air varies with ambient temperature due to changes in air density. A 50° F. increase in the ambient temperature typically causes more than 25% loss of power, as shown in FIG. 1. In addition, the temperature increase leads to increased fuel consumption and emissions of NOx. The problem thus is that gas turbine power decreases and heat rate increases with increasing ambient temperature.

One approach to avoiding the power degradation caused by high ambient temperature is to cool the inlet air. Various methods of doing this have been proposed, each with some degree of success, but also introducing new problems. The methods include vapor compression refrigeration, ice storage, absorption cooling, and evaporative cooling.

The traditional method of vapor compression refrigeration consumes about the same amount of fuel as that saved due to reduction in the heat rate, and the required added capital for the refrigeration equipment is comparable to the cost of the incremental turbine capacity increase. In addition, due to the phase out of CFCs, this approach relies on use of HCFCs and HFCs. HCFCs are currently in the process of being replaced by HFCs due to environmental concerns, and reliable, cost effective HFC alternatives are not yet fully developed. Cost and energy consumption may significantly increase due to utilization of an environmentally acceptable HFC. Thus, it is desirable to identify an alternative that is low in cost, consumes less energy, and does not rely on utilization of HFCs or HCFCs.

In recent turbine inlet air-cooling installations, the capital necessary for refrigeration equipment has been substantially reduced via thermal storage, e.g., using large store rooms of ice. In this approach, the refrigeration system is sized for only about 20% of the full refrigeration duty. When cooling inlet air, the ice storage supplies most or all of the refrigeration duty. The refrigeration system replenishes the ice during off-peak periods. This approach achieves increased turbine capacity, at a cost between $100/kW and $200/kW; however, its major disadvantages are that the cooling is available less than 20% of the time, and there is no net energy saving. Due to these constraints, it is viable only in conjunction with peaking combustion turbines for electric utilities. In addition, this approach relies on the use of HCFCs or HFCs, and shares the shortcomings with the traditional vapor compression system.

Use of absorption cooling to cool the turbine inlet air attracts interest because the heat content of the hot turbine exhaust can be used as the heat source for the absorption apparatus. This approach to inlet air-cooling has the advantages that a substantial degree of cooling is reliably available at all times, and the compression energy savings is almost fully preserved. However, the capital requirements for absorption refrigeration are typically substantially higher than for a mechanical compressor supplying the same cooling duty.

Evaporative cooling offers a low cost, low energy method for decreasing the compressor air inlet temperature. This approach relies on a significant difference between ambient wet bulb and dry bulb temperatures. Its major disadvantages are the unreliability of the cooling capacity due to the dependency upon vagaries of weather, and typically only a small amount of cooling is possible.

BRIEF DESCRIPTION OF THE INVENTION

In an exemplary embodiment of the invention, a turbine inlet air-cooling system is provided. A dehumidifier receives process airflow and reduces a moisture content of the process airflow. An indirect evaporative cooler receives the process airflow from the dehumidifier and is driven by the process airflow from the dehumidifier such that a first portion of the process airflow is contacted directly with water and a second portion of the process airflow is cooled without any addition of moisture. A direct evaporative cooler receives the second portion of the process airflow, which is contacted directly with water to provide evaporative cooling. Subsequently, the direct evaporative cooler outputs the second portion of the process airflow to the turbine.

In another exemplary embodiment of the invention, a method of cooling turbine inlet air includes the steps of receiving process airflow and reducing a moisture content of the process airflow in a dehumidifier; driving an indirect evaporative cooler with the process airflow from the dehumidifier by contacting a first portion of the process airflow directly with water and cooling a second portion of the process airflow without any addition of moisture; and contacting the second portion of the process airflow directly with water in a direct evaporative cooler to provide evaporative cooling, wherein the direct evaporative cooler outputs the second portion of the process airflow to the turbine.

In yet another exemplary embodiment of the invention a liquid desiccant circuit for circulating a liquid desiccant through a dehumidifier includes a regenerator for evaporating moisture and reconcentrating the liquid desiccant.

DETAILED DESCRIPTION OF THE INVENTION

Figure 2:
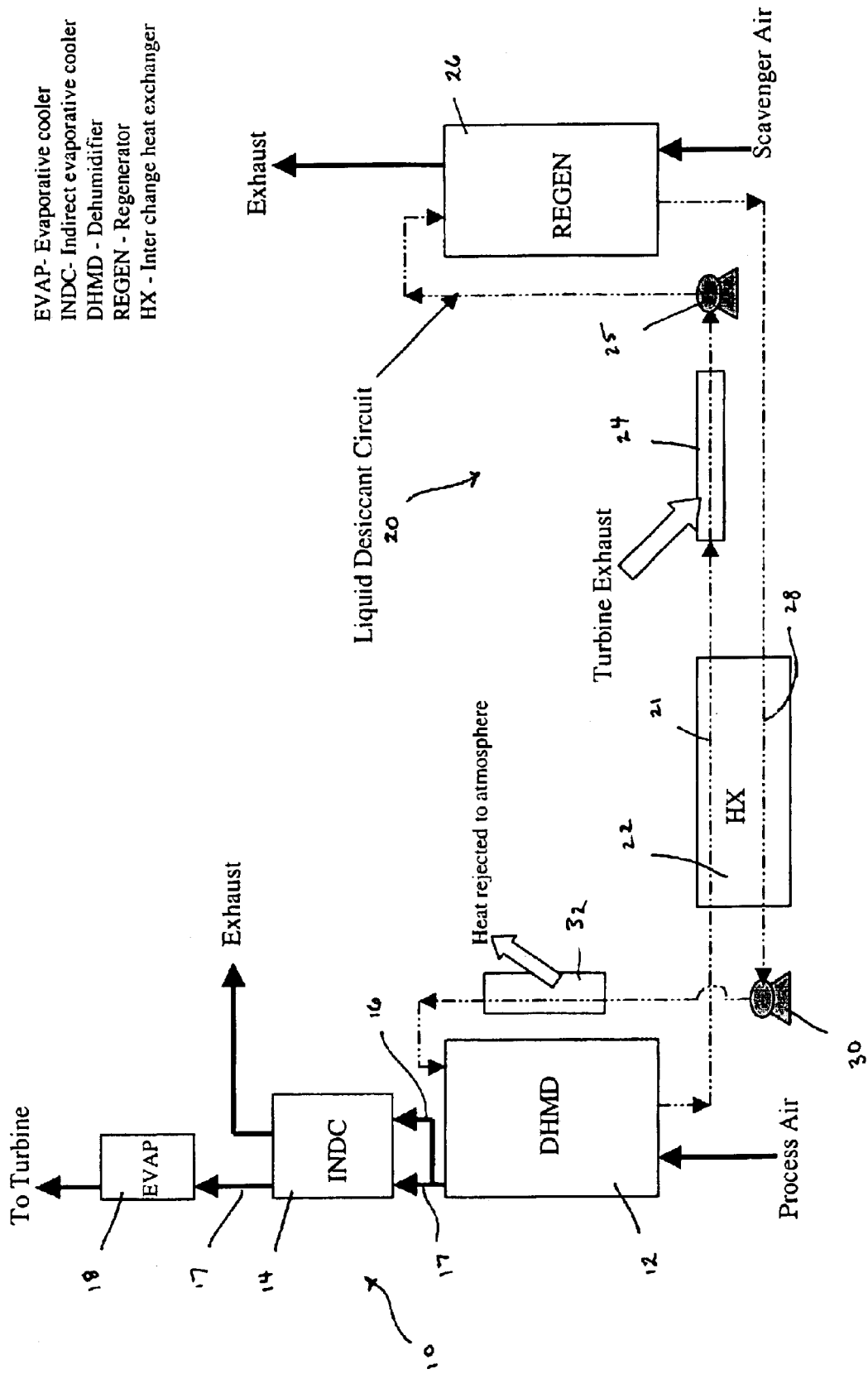
FIG. 2 is a schematic illustration of the turbine inlet air-cooling system of the present invention.
Figure 1:
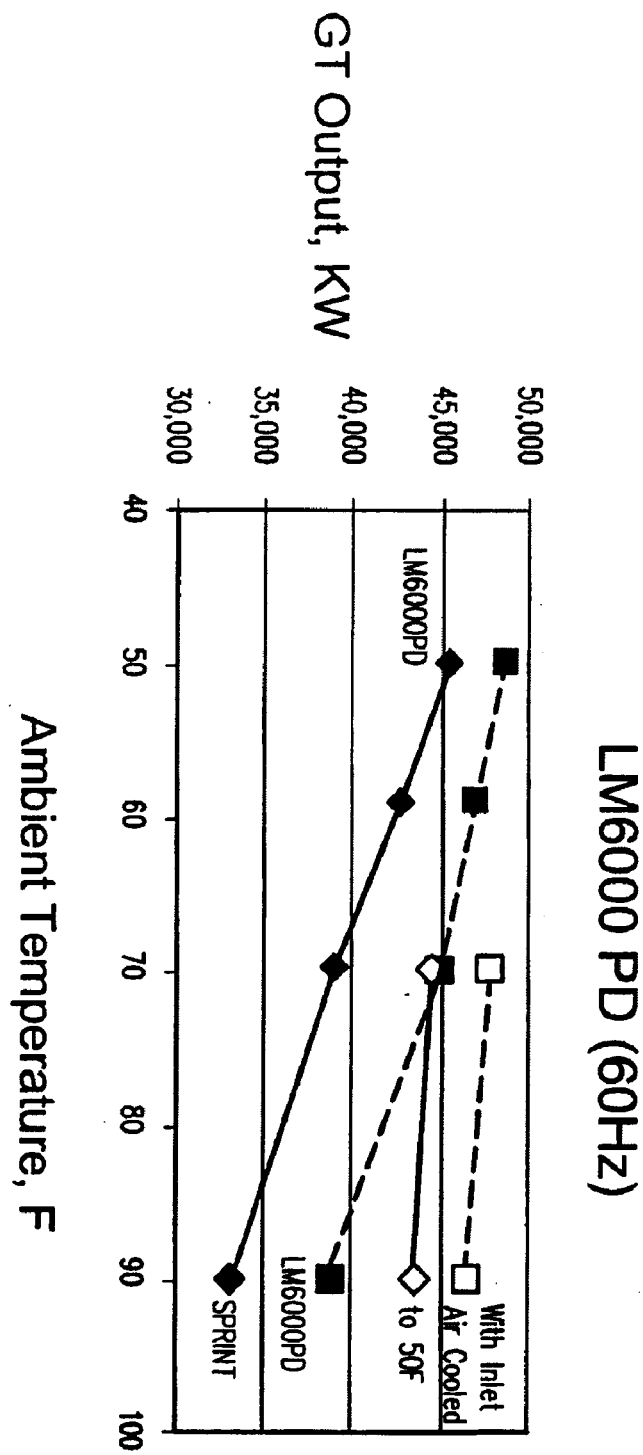

The turbine inlet air-cooling system 10 of the present invention is depicted schematically in FIG. 2. The system 10 includes a dehumidifier 12 that receives process airflow and serves to reduce a moisture content of the process airflow. Preferably, the process airflow in the dehumidifier is contacted with a liquid desiccant, which absorbs the moisture in the process airflow and dries the air. A liquid desiccant circuit 20 will be described in more detail below.

Air leaving the dehumidifier 12 is subsequently further cooled using a combination of indirect and direct evaporative coolers. An indirect evaporative cooler 14 receives the process airflow from the dehumidifier 12. The indirect evaporative cooler 14 is driven by the process airflow from the dehumidifier 12 such that a first portion 16 of the process airflow is contacted directly with water and subsequently exhausted, and a second portion 17 of the process airflow is cooled without any addition of moisture. The first and second portions of the process airflow have a heat exchange relationship in the indirect evaporative cooler 14. Because dry air from the dehumidifier 12 is used to drive the indirect evaporative cooler 14, substantial cooling benefits are consistently available, independent of the ambient conditions.

The second portion 17 of the process airflow leaves the indirect evaporative cooler 14 as cool, dry air and proceeds to a direct evaporative cooler 18. In the direct evaporative cooler 18, the air is contacted directly with water to provide evaporative cooling. Unlike conventional applications of evaporative cooling, the evaporative cooler 18 in the system of the present invention always receives dry air, which in turn maximizes the cooling benefits. Subsequently, cool air leaving the evaporative cooler 18 enters the turbine compressor.

With continued reference to FIG. 2, in a preferred arrangement, the dehumidifier 12 is coupled with a liquid desiccant circuit 20 containing a liquid desiccant. It will be appreciated by those of ordinary skill in the art that other suitable components may be used in the dehumidifier to perform the function of reducing a moisture content of the process airflow. For example, a system incorporating a solid desiccant may be used. Additionally, other systems that serve to reduce a moisture content of the process airflow may be incorporated in the dehumidifier 12.

The liquid desiccant in the dehumidifier 12 via the liquid desiccant circuit 20 absorbs moisture from and dries the process airflow. Moisture absorption by the desiccant dilutes the desiccant and reduces its capacity to absorb moisture. The cold dilute liquid desiccant then flows through a cool portion 21 of a heat recovery heat exchanger 22. A turbine exhaust heat exchanger 24 heats the liquid desiccant using heat from the turbine exhaust. This increases the water vapor pressure of the desiccant above that of the air supplied to the regenerator. Subsequently, the partially heated dilute liquid desiccant is directly contacted with scavenger air in a regenerator 26 via a pump 25 to evaporate the moisture and to reconcentrate the desiccant. This is an indirect heat exchange with the liquid desiccant to avoid any contamination. The liquid desiccant can be heated before entering the regenerator 26, i.e., via the turbine exhaust heat exchanger 24, or alternatively within the regenerator 26 to achieve simultaneous heat and mass exchange. This is an indirect heat exchange of the turbine exhaust with the liquid desiccant to avoid any contamination.

The heated and reconcentrated liquid desiccant then flows through a warm portion 28 of the heat recovery heat exchanger 22. In this manner, the heat recovery heat exchanger 22 transfers the heat from the hot concentrated desiccant from the regenerator 26 in the warm portion 28 of the heat exchanger 22 to the cold dilute desiccant from the dehumidifier 12 in the cool portion 21 of the heat exchanger 22. Subsequently, the liquid desiccant is pumped back to the dehumidifier 12 through an ambient heat exchanger 32 via a pump 30. Heat is rejected in the heat exchanger 32 to the atmosphere, which brings the dried liquid desiccant temperature to within two to five degrees of the ambient temperature. One suitable arrangement for this heat exchanger 32 could include a fan driving ambient air over a finned section of the heat exchanger 32. The liquid desiccant is separated from the air by a finned tube-wall. Of course, other suitable arrangements may be utilized.

With the system and method of the invention, a turbine inlet air-cooling system has low power consumption (high electrical coefficient of performance (eCOP)), low first cost, and provides cooling benefits independent of weather conditions. The system includes a combination of direct and indirect evaporative coolers fluidly communicating with a dehumidifier to provide reliable cooling benefits even in wet (high humidity) weather conditions. A fraction of the dry air leaving the dehumidifier is used to power the indirect evaporative cooler. It has been shown that the system effects a gross output power increase of about 25% and a net output power increase of about 24%, with a very high eCOP (about 40). Additionally, the system is environmentally friendly, utilizing no CFCs, HCFCs, or HFCs. Still further, the system efficiently utilizes the turbine exhaust. The system is also adaptable in that it can be used as an add-on system to increase the performance of existing installations. The desiccant dehumidifier offers a significant reduction in the inlet air dew point, which can eliminate air icing concerns, allowing the use of the system even in milder climates and resulting in an increase in overall turbine efficiency. With the utilization of a liquid desiccant and that of dry air to drive the indirect evaporative cooler, the system delivers consistent cooling similar to that of a vapor compression refrigeration system, while its auxiliary power consumption is substantially lower than that of the vapor compression system.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

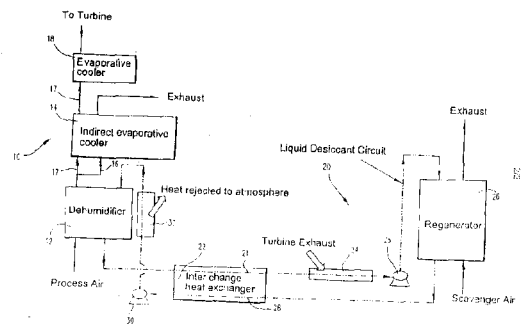

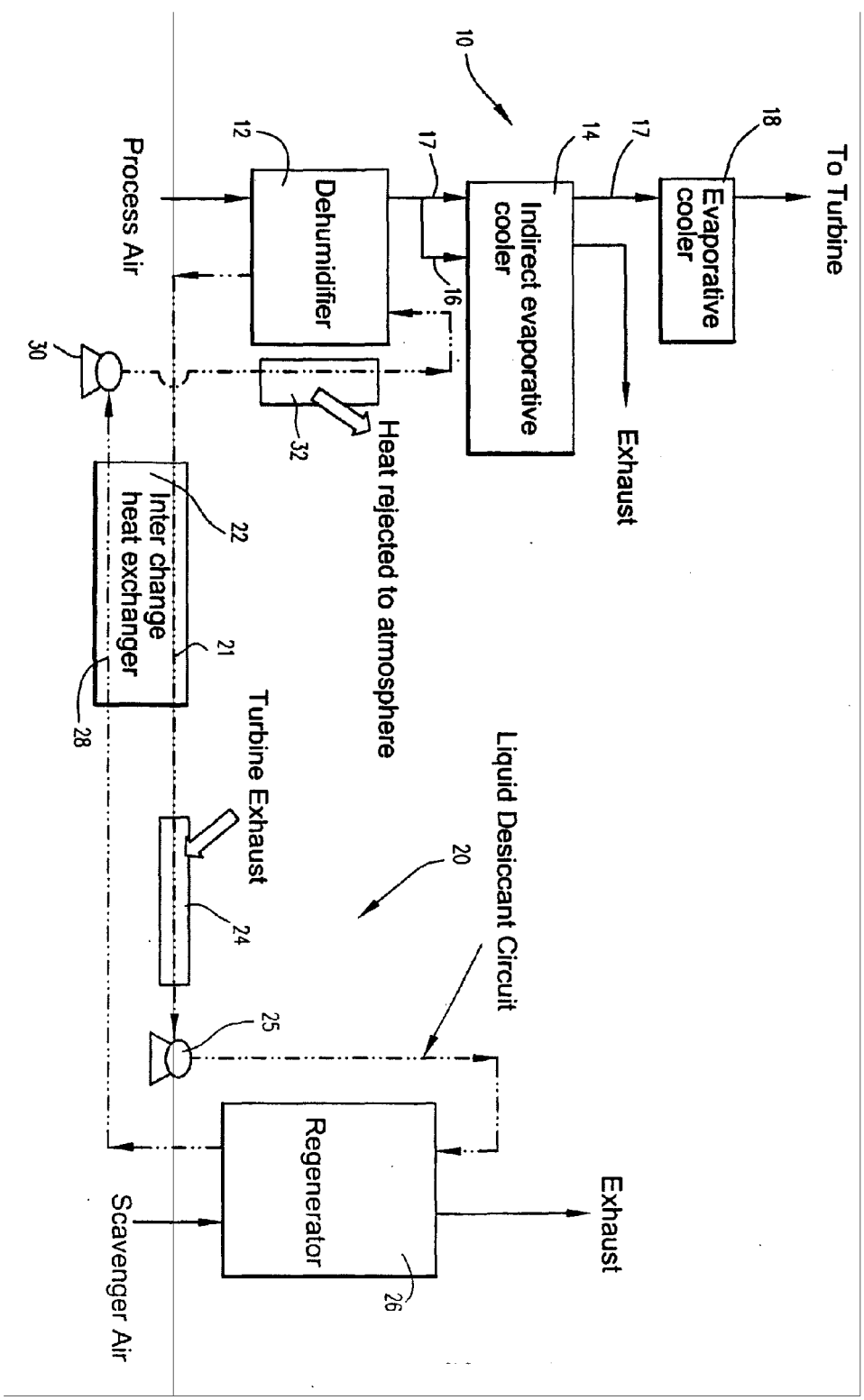

What is claimed is:

1. A turbine inlet air-cooling system comprising:
    a dehumidifier receiving process airflow and reducing a moisture content of the process airflow;
    an indirect evaporative cooler receiving the process airflow from the dehumidifier, the indirect evaporative cooler being driven by the process airflow from the dehumidifier such that a first portion of the process airflow is contacted directly with water and a second portion of the process airflow is cooled without any addition of moisture; and
    a direct evaporative cooler receiving the second portion of the process airflow, wherein the second portion of the process airflow is contacted directly with water to provide evaporative cooling, the direct evaporative cooler outputting the second portion of the process airflow to the turbine.

2. A turbine inlet air-cooling system according to claim 1, wherein the dehumidifier is coupled with a liquid desiccant circuit containing liquid desiccant, the liquid desiccant absorbing moisture from the process airflow.

3. A turbine inlet air-cooling system according to claim 2, wherein the liquid desiccant circuit comprises a regenerator for evaporating moisture and reconcentrating the liquid desiccant.

4. A turbine inlet air-cooling system according to claim 3, wherein the liquid desiccant circuit further comprises a heat recovery heat exchanger and a turbine exhaust heat exchanger upstream of the regenerator, wherein the liquid desiccant circuit is configured such that liquid desiccant leaving the dehumidifier flows in series through a cool portion of the heat recovery heat exchanger, the turbine exhaust heat exchanger, the regenerator, a warm portion of the heat recovery heat exchanger, and back to the dehumidifier.

5. A turbine inlet air-cooling system according to claim 4, wherein the liquid desiccant circuit further comprises a first pump driving the liquid desiccant through the regenerator and a second pump driving the liquid desiccant from the warm portion of the heat recovery heat exchanger through the dehumidifier.

6. A turbine inlet air-cooling system according to claim 3, wherein the regenerator comprises a turbine exhaust heat exchanger for effecting an indirect heat exchange between the liquid desiccant and exhaust from the turbine.

7. A turbine inlet air-cooling system according to claim 1, wherein the dehumidifier comprises a solid desiccant for absorbing moisture from the process airflow.

8. A method of cooling turbine inlet air comprising:
  receiving process airflow and reducing a moisture content of the process airflow in a dehumidifier;
  driving an indirect evaporative cooler with the process airflow from the dehumidifier by contacting a first portion of the process airflow directly with water and cooling a second portion of the process airflow without any addition of moisture; and
  contacting the second portion of the process airflow directly with water in a direct evaporative cooler to provide evaporative cooling, the direct evaporative cooler outputting the second portion of the process airflow to the turbine.

9. A method according to claim 8, wherein the dehumidifier is coupled with a liquid desiccant circuit containing liquid desiccant, and wherein the step of reducing a moisture content of the process airflow comprises absorbing moisture with the liquid desiccant.

10. A method according to claim 9, wherein the liquid desiccant circuit comprises a regenerator, the method further comprising evaporating moisture from and reconcentrating the liquid desiccant in the regenerator.

11. A method according to claim 10, wherein the liquid desiccant circuit further comprises a heat recovery heat exchanger and a turbine exhaust heat exchanger upstream of the regenerator, the method further comprising configuring the liquid desiccant circuit such that liquid desiccant leaving the dehumidifier flows in series through a cool portion of the heat recovery heat exchanger, the turbine exhaust heat exchanger, the regenerator, a warm portion of the heat recovery heat exchanger, and back to the dehumidifier.

12. A method according to claim 11, further comprising pumping the liquid desiccant through the regenerator, and pumping the liquid desiccant from the warm portion of the heat recovery heat exchanger through the dehumidifier.

13. A method according to claim 11, further comprising pumping a fraction of the liquid desiccant through the regenerator, and recirculating a remaining portion of the liquid desiccant in the dehumidifier.

14. A method according to claim 8, wherein the step of reducing a moisture content of the process airflow comprises absorbing moisture with a solid desiccant.

15. A liquid desiccant circuit for circulating a liquid desiccant through a dehumidifier, the liquid desiccant circuit comprising:
  a regenerator for evaporating moisture and reconcentrating the liquid desiccant; and
  a heat recovery heat exchanger and a turbine exhaust heat exchanger upstream of the regenerator,
  the liquid desiccant circuit being configured such that liquid desiccant leaving the dehumidifier flows in series through a cool portion of the heat recovery heat exchanger, the turbine exhaust heat exchanger, the regenerator, a warm portion of the heat recovery heat exchanger, and back to the dehumidifier.

16. A liquid desiccant circuit according to claim 15, further comprising a first pump driving the liquid desiccant through the regenerator and a second pump driving the liquid desiccant from the warm portion of the heat recovery heat exchanger through the dehumidifier.

* * * * *

UNITED STATES PATENT AND TRADEMARK OFFICE
CERTIFICATE OF CORRECTION

PATENT NO. : 6,837,056 B2
DATED : January 4, 2005
INVENTOR(S) : Potnis et al.

It is certified that error appears in the above-identified patent and that said Letters Patent is hereby corrected as shown below:

The title page should be deleted and substitute therefore the attached title page as shown on the attached page.

Figure 1:
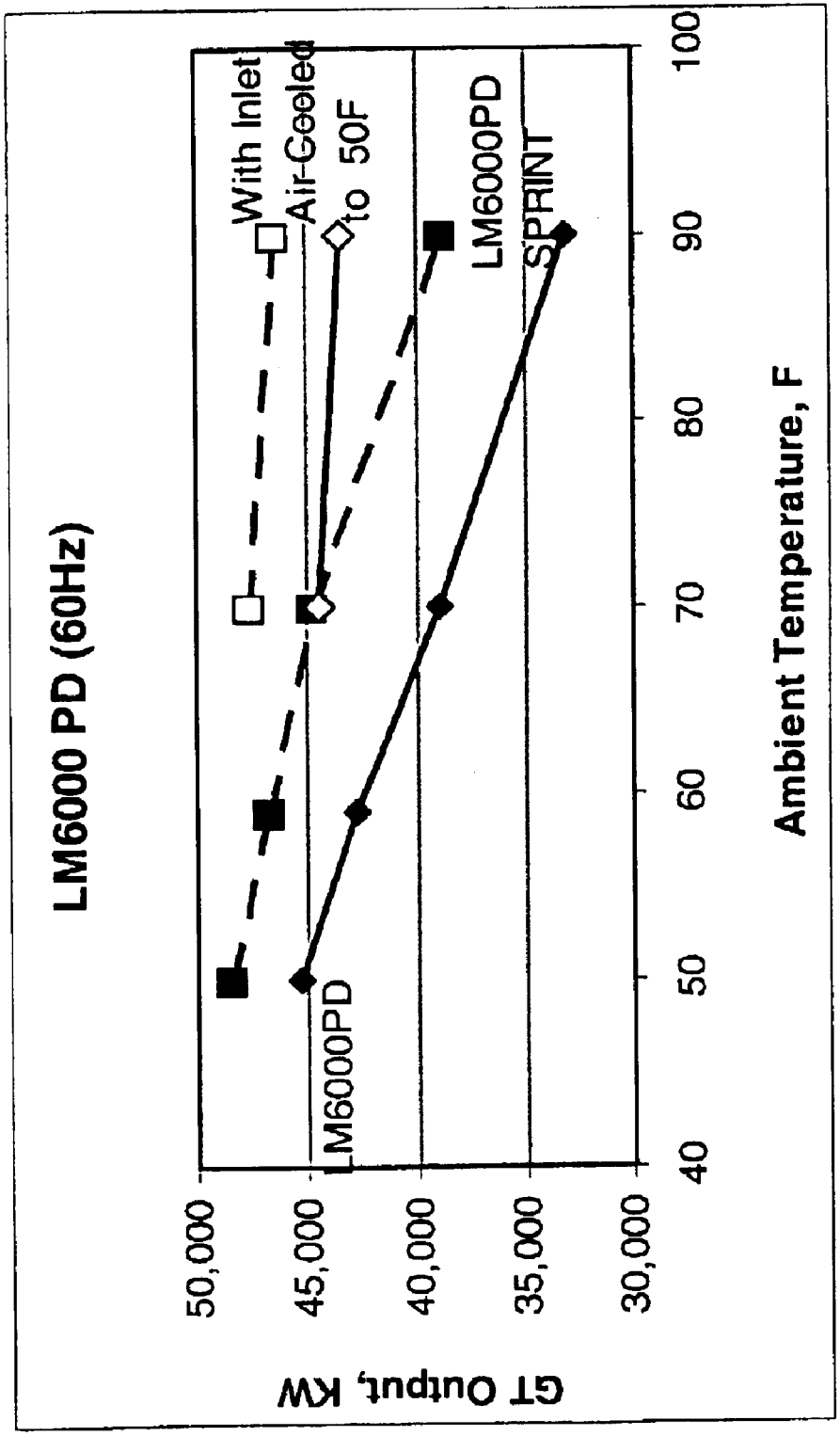
FIG. 1 illustrates the effect of an ambient temperature increase on turbine power output on several turbine models.

Delete figures 1 and 2 in the issued patent and insert therefor the attached two (2) sheets of formal drawings containing Figures 1 and 2.

Signed and Sealed this

Twenty-third Day of August, 2005

JON W. DUDAS
*Director of the United States Patent and Trademark Office*

(12) United States Patent
Potnis et al.

(10) Patent No.: US 6,837,056 B2
(45) Date of Patent: Jan. 4, 2005

(54) TURBINE INLET AIR-COOLING SYSTEM AND METHOD

(75) Inventors: Shailesh Vijay Potnis, Greer, SC (US); Narendra Digamber Joshi, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 46 days.

(21) Appl. No.: 10/322,752

(22) Filed: Dec. 19, 2002

(65) Prior Publication Data
US 2004/0118125 A1 Jun. 24, 2004

(51) Int. Cl.7 .................................................. F02C 3/30
(52) U.S. Cl. ........................ 60/775; 60/775; 60/39.5; 60/39.511
(58) Field of Search ........................ 60/775, 39.3, 39.5, 60/39.511, 39.52, 39.53, 730, 728; 62/271; 95/149

(56) References Cited

U.S. PATENT DOCUMENTS

| | | | |
|---|---|---|---|
| 4,205,529 A | * 6/1980 | Ko | 62/235.1 |
| 4,222,244 A | * 9/1980 | Meckler | 62/235.1 |
| 4,955,205 A | * 9/1990 | Wilkinson | 62/94 |
| 5,020,334 A | * 6/1991 | Wilkinson | 62/271 |
| 5,022,241 A | * 6/1991 | Wilkinson | 62/271 |
| 5,070,703 A | * 12/1991 | Wilkinson | 62/94 |
| 5,165,241 A | 11/1992 | Joshi et al. | |
| 5,182,921 A | * 2/1993 | Yan | 62/235.1 |
| 5,203,161 A | * 4/1993 | Lehto | 60/39.53 |
| 5,251,447 A | 10/1993 | Joshi et al. | |
| 5,323,604 A | 6/1994 | Ekstedt et al. | |
| 5,351,477 A | 10/1994 | Joshi et al. | |
| 5,511,375 A | 4/1996 | Joshi et al. | |
| 5,590,529 A | 1/1997 | Joshi et al. | |
| 5,596,873 A | 1/1997 | Joshi et al. | |
| 5,613,363 A | 3/1997 | Joshi et al. | |
| 5,638,682 A | 6/1997 | Joshi et al. | |
| 5,675,971 A | 10/1997 | Angel et al. | |
| 5,680,766 A | 10/1997 | Joshi et al. | |
| 5,778,676 A | 7/1998 | Joshi et al. | |
| 5,816,049 A | 10/1998 | Joshi | |
| 5,865,024 A | 2/1999 | Kress et al. | |
| 5,890,372 A | * 4/1999 | Belding et al. | 62/271 |
| 6,050,082 A | 4/2000 | Leonard et al. | |
| 6,050,100 A | * 4/2000 | Belding et al. | 62/271 |
| 6,141,967 A | 11/2000 | Angel et al. | |
| 6,178,762 B1 | * 1/2001 | Flax | 62/271 |
| 6,195,607 B1 | 2/2001 | Rajamani et al. | |
| 6,216,483 B1 | * 4/2001 | Potnis et al. | 62/271 |
| 6,449,953 B1 | 9/2002 | Hook, Jr. et al. | |
| 6,460,340 B1 | 10/2002 | Chauvette et al. | |
| 6,513,339 B1 | * 2/2003 | Kopko | 62/94 |

* cited by examiner

*Primary Examiner*—Cheryl J. Tyler
*Assistant Examiner*—William H. Rodriguez
(74) *Attorney, Agent, or Firm*—Nixon & Vanderhye P.C.

(57) ABSTRACT

A turbine inlet air-cooling system improves turbine performance and efficiency. A dehumidifier receives process airflow and reduces a moisture content of the process airflow. An indirect evaporative cooler receives the process airflow from the dehumidifier and is driven by the process airflow from the dehumidifier such that a first portion of the process airflow is contacted directly with water and a second portion of the process airflow is cooled without any addition of moisture. A direct evaporative cooler receives the second portion of the process airflow, which is contacted directly with water to provide evaporative cooling. Subsequently, the direct evaporative cooler outputs the second portion of the process airflow to the turbine.

16 Claims, 2 Drawing Sheets